Nov. 14, 1950        D. PATAKI ET AL        2,529,705
                      BROACHING MACHINE

Filed June 6, 1947                         3 Sheets-Sheet 1

INVENTOR.
Denes Pataki
Benedict Welte
BY
Harness Dickey = Pierce
ATTORNEYS.

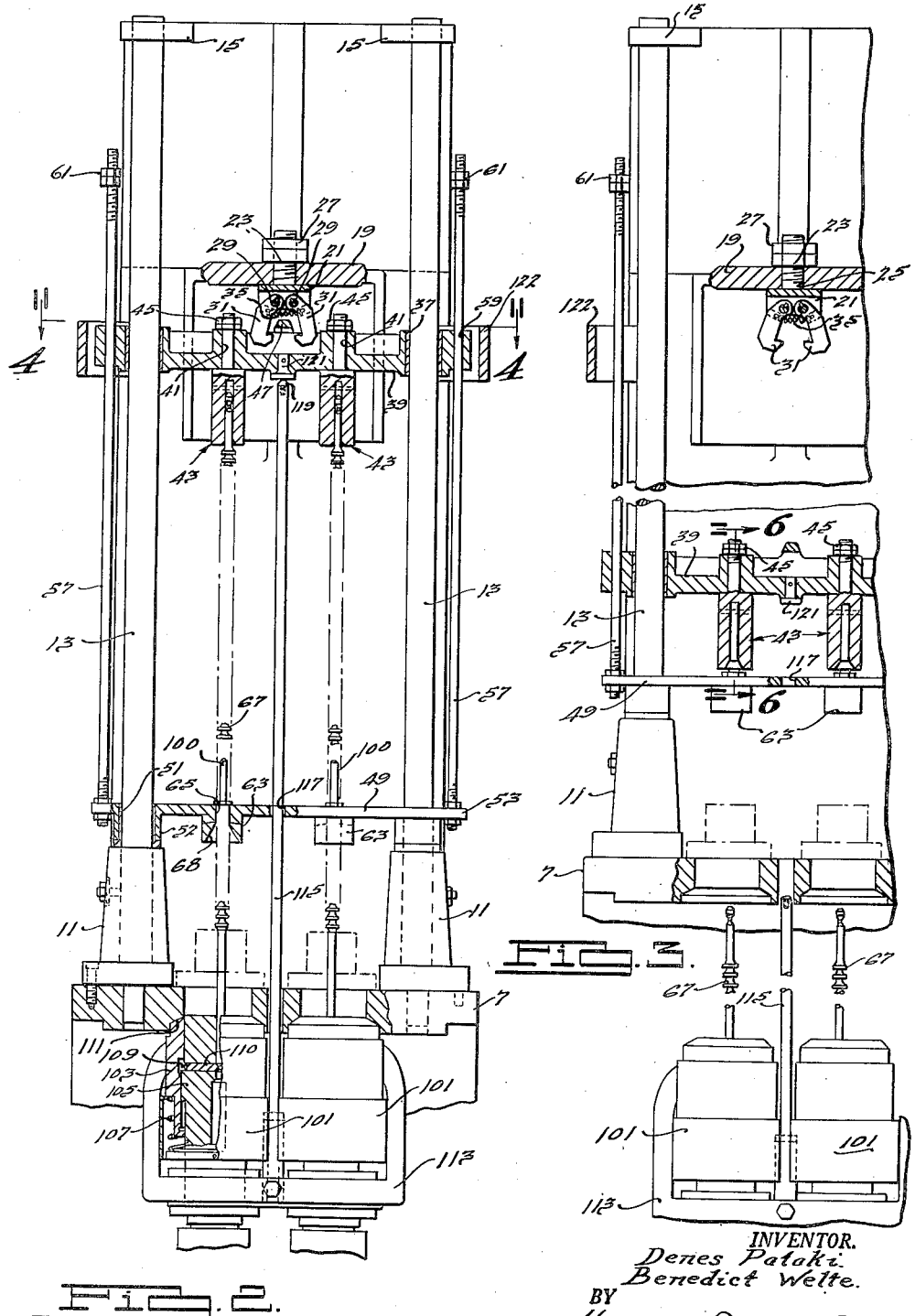

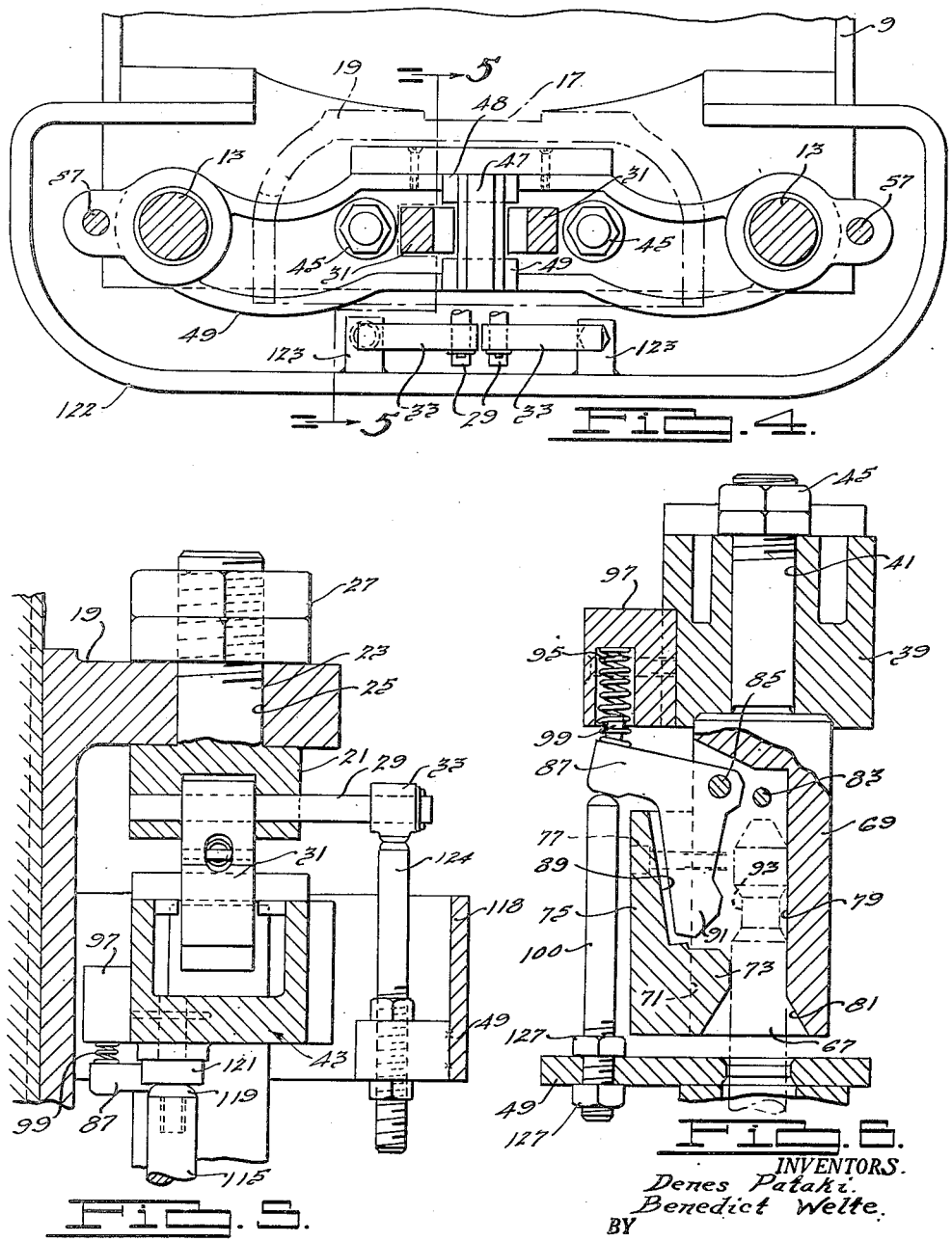

Patented Nov. 14, 1950

2,529,705

UNITED STATES PATENT OFFICE 2,529,705

BROACHING MACHINE

Denes Pataki, Detroit, and Benedict Welte, Lake Orion, Mich., assignors to Colonial Broach Company, Warren Township, Mich., a corporation of Delaware Application June 6, 1947, Serial No. 753,006

11 Claims. (Cl. 90—33)

This invention relates to automatic shuttling pull broaching machines of the type adapted to pull long slender broaches through workpiece apertures and more particularly to improved means for guiding said broaches so as to prevent breakage thereof.

Much difficulty has been encountered in automatic pull broaching operations when long relatively small diameter broaches are used, in that occasionally the free ends of the broaches, being carried by broach handling chucks, fail to be properly aligned with apertures in a workpiece through which the broaches must pass, in order to be engaged by the broach pulling chucks. This misalignment causes the broaches to abut against the workpiece and break. Also, even if the broaches are guided properly into the workpiece apertures, when the trailing ends of the broaches are released from the broach handling chucks and the leading ends pulled by the broach pulling chucks through the workpiece, the trailing ends of the broaches have a tendency to whip or sway which may cause them to break or be unsatisfactory in operation.

Accordingly, it is an object of this invention to provide a pull broaching machine having means for guiding the advancing end of a broach carried by a broach handling chuck.

It is a further object of this invention to provide means for guiding the trailing end of a broach, after it has been released by the broach handling slide and the leading end thereof has been engaged and is being pulled through the work by a pull chuck.

It is a still further object of this invention to provide in a pull broaching machine means for permitting the broach handling chuck to guide the trailing edge of a broach during the broach pulling operation without requiring a correspondingly lengthened broach handling cylinder.

It is a still further object of this invention to provide a pull broaching machine of the aforementioned type which is simple in operation, inexpensive to manufacture, and rugged in construction.

These and other objects of this invention will become apparent from the following detailed description taken in conjunction with the accompanying drawings in which:

Fig. 2 is a fragmentary view, partially in section and partially in elevation, of the structure illustrated in Fig. 1 with the broach handling chucks in the position they occupy when the advancing end of the broaches is engaged by the pull chucks;

Fig. 3 is a fragmentary view, partially in section and partially in elevation, of the structure illustrated in Fig. 1 with the broach handling chucks and pulling chucks in their lowermost position;

Fig. 4 is a fragmentary view, partially in section and partially in elevation, taken along the line 4—4 of Fig. 2;

Fig. 5 is an enlarged fragmentary sectional view taken along the line 5—5 of Fig. 4;

Fig. 6 is an enlarged fragmentary sectional view taken along the line 6—6 of Fig. 3.

Figure 1:
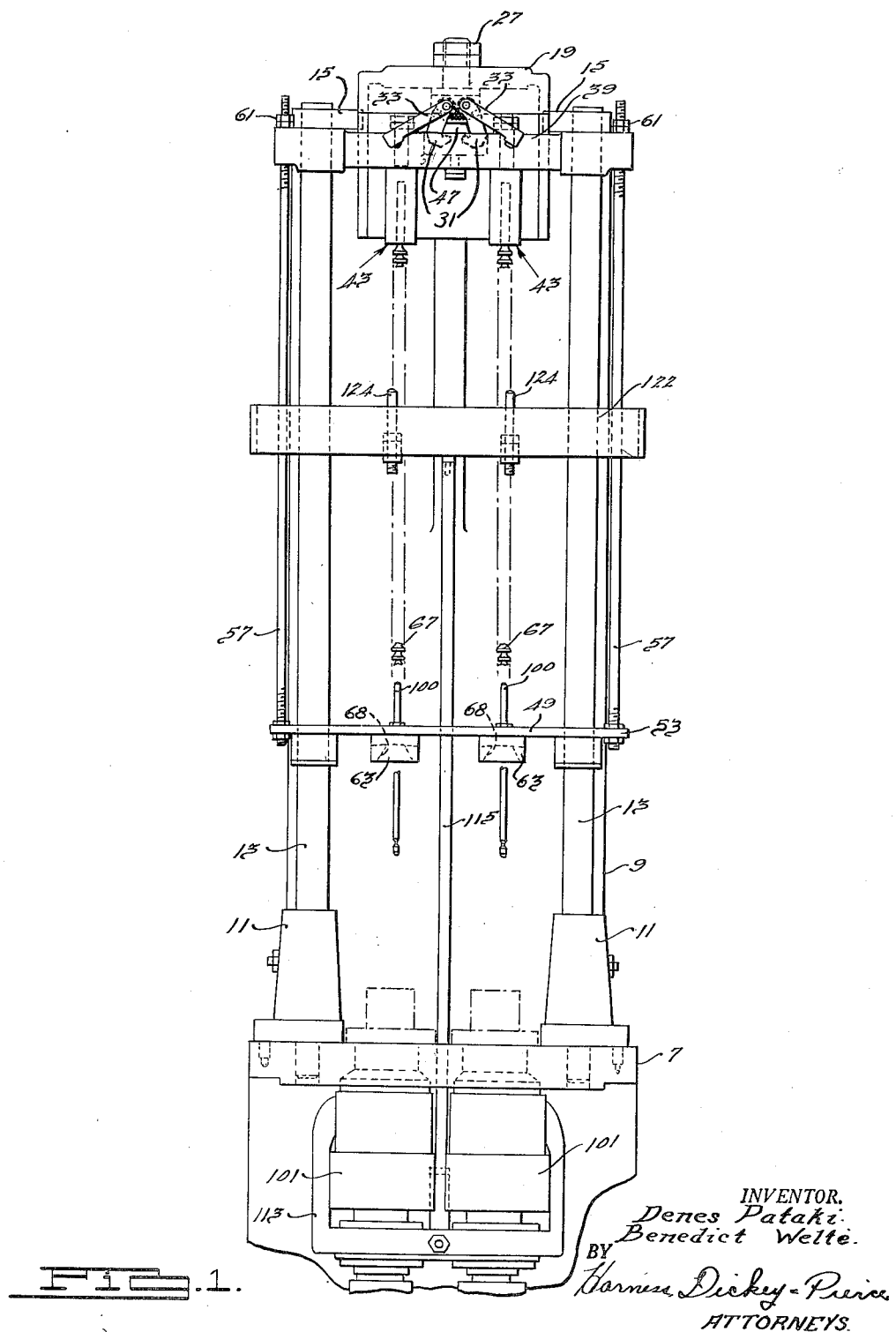
Figure 1 is a fragmentary front elevational view of a broaching machine adapted to shuttle two broaches simultaneously and embodying the invention, with the broach handling chucks in their uppermost position.

The invention is shown in the drawings as applied to a pull down shuttle broaching machine of the type shown in greater detail in Patent No. 2,395,702, of February 26, 1946. The machine includes a stationary work-supporting table 7 and a vertically extending frame 9. Fixedly supported adjacent opposite sides of the worktable 7 by means of supporting feet 11 are a pair of stationary parallel guide bars 13 which extend upwardly from the work-supporting table. The upper ends of the guide bars 13 are fixed to the upper end of the frame 9 by means of suitable supporting brackets 15. A vertically reciprocating slide 17 is mounted in suitable ways on the front face of the upper portion of the machine and is operated in the usual manner by a hydraulic cylinder and piston, not shown. A bracket 19 is fixed to the front face of the slide 17 and carries a channel-shaped supporting element 21 having a threaded stem 23 extending upwardly through an aperture 25 in the top wall of the bracket 19. Lock nuts 27 secure the element 21 in position.

Pivotally mounted in the channel element 21 by means of a pair of laterally spaced parallel shafts 29, is a pair of facing jaw elements 31. The forward ends of the shafts 29 extend outwardly through one wall of the channel-shaped element 21, as can be seen in Fig. 5. A lever element 33 is fixed to the forward end of each of the shafts 29 so that upon upward movement of the outer ends of the levers 33, the jaw elements 31 will separate from each other. A coil spring 35 is stretched between the jaw elements 31 and constantly urges them toward each other.

Slidably mounted on the stationary guide bars 13 by means of sleeve bushings 37 is a handling chuck fixture 39. The fixture is provided with a pair of laterally spaced apertures 41 adapted to receive the shank portions of broach handling chucks, generally indicated at 43, which are secured to the fixture by means of lock nuts 45. Positioned on the upper surface of the fixture 39 is a bar 47, which is supported in a raised horizontal position by suitable brackets 48. This bar 47 is adapted to be engaged by the jaw elements 31 so as to connect the chuck fixture 39 to the bracket 19 and allow it to move therewith when the bracket 19 is reciprocated with slide 17 by hydraulic means within the broaching machine.

Disposed below the broach handling chucks 43 and above the worktable 7 is a guide plate 49 which is slidably mounted on the guide bars 13 by means of sleeve bushings 51 supported in depending guide plate bosses 52. The opposite ends of the guide plate 49 project outwardly beyond the guide bars 13 as at 53, and rigidly secured to each end portion is a rod 57 which extends upwardly parallel to the guide bars 13. The upper ends of the rods 57 are slidably received in apertures 59 on opposite sides of the chuck fixture 39, and lock nuts 61 are provided thereon so that when the fixture 39 is in the uppermost position, as viewed in Fig. 1, it will carry the rods 57 and the guide plate 49 upwardly and support them in the raised position.

The guide plate 49 is provided with a pair of laterally spaced bosses 63 which project downwardly from the under side thereof, and each boss has an aperture 65 therein adapted to receive broaches 67 which are carried by the broach handling chucks 43. The lower end of each aperture 65 is bellmouthed, as at 68, for a reason which will hereinafter appear. As can be seen in Fig. 2, the guide plate 49 will rest upon the guide bar supporting feet 11 when lowered thereon by the fixture 39. When the guide plate 49 is seated upon the feet 11, the rods 57 will then be stationary, but the fixture 39 can still slide upwardly or downwardly thereon.

The broach handling chucks 43 are identical in construction and one is shown in detail in Fig. 6. The chuck comprises a generally rectangular shaped body 69 which has a groove 71 cut in the front face thereof to receive a projection 73 of a plate 75, which is secured to the lower end of the inner face of the body 69 by means of screws 77. The body 69 likewise is provided with a vertical bore 79 therein, the lower end of which is beveled at 81 to receive the broach 67. The upper end of the bore 79 is provided with a transverse pin 83 which acts as a stop to limit the upward movement of the broach 67 within the bore. Pivotally mounted within the body 69 of the chuck by means of a pin 85 is a latch element 87, the lower end of which is free to swing or move within the body, due to the groove 71 therein and a notch 89 in the plate 75. The lower end of the latch element 87 is provided with a dog 91 adapted to fit a groove 93 cut in the upper end of the broach 67. The dog 91 in the lower end of the latch 87 is normally held in engagement with the groove 93 in the broach by means of a compression spring 95 mounted in a plate 97 secured to the fixture 39 above the chuck body 69. A vertical pin 99 is provided on the upper and outer end of the latch element which is received within the spring 95 to prevent lateral displacement of the latter.

The under side of the outer end of the latch element 87 is adapted to abut against a pin 100 adjustably secured to the guide plate 49 to release the broach from the chuck when the fixture reaches the lower extremity of its stroke.

Disposed below the worktable 7 is a pair of laterally spaced broach pulling chucks 101 adapted to be reciprocated in suitable guide means by any suitable hydraulic system, such as the type illustrated in Patent No. 2,395,702, issued February 26, 1946. The broach pulling chucks are of a conventional automatic releasing type provided with a slidable collar 103, surrounding the chuck body 105, which is spring actuated by means of a spring 107, and which has a groove 109 around the inner periphery thereof into which the outer end of a dog 110, for engaging the broach, can move when the collar is pressed downwardly against the spring by means of a stationary abutment 111 on the under side of the worktable 7. This type of chuck is illustrated and described in detail in Patent No. 2,338,989, issued January 11, 1944.

Fixedly connected to the pull bracket 113, which carries both of the chucks 101, is a vertically extending rod 115, which extends through an aperture 117 in the guide plate 49. The upper end of the rod 115 has a hardened button 119 thereon adapted to abut against a complemental button 121 mounted on the under side of the broach handling chuck fixture 39 so as to support the fixture after it has been released from the bracket 19.

Intermediate the ends of the guide bars 13 and fixedly secured to the frame 9, is a transversely extending bracket member 122. Adjustably secured to lugs 123, which are welded to the inner face of the bracket 122, is a pair of upwardly extending laterally spaced cylindrical rods 124 which are adapted to abut the levers 33, when the bracket 19 is moved downwardly to its fullest extent. This abutment forces the levers 33 upwardly, thus causing the jaw elements 31 to open and release the fixture bar 47. When the bar 47 is released, the fixture 39 is disengaged from the bracket 19. The abutment rods 124 are positioned so that the lower end of the broaches 67 will be engaged by the broach pulling chucks 101 when the fixture 39 is released from the bracket 19. When this occurs, as shown in Fig. 2, the upper end of the rod 115 abuts against the button 121 on the under side of the fixture 39 to support the fixture 39 with respect to the broach pulling chucks 101 and also retain a fixed relationship between the broach handling chucks 43 and the broach pulling chucks 101 as the pulling chucks are moved downwardly.

Secured to the slidable guide plate 49, as seen in Fig. 6 by means of lock nuts 127 are the previously mentioned vertically extending rods 100 which abut the outer extremities of the latch elements 87 of the broach handling chucks 43 when the chuck fixture 39 is lowered a sufficient distance, and thereby release the broaches 67 from the broach handling chucks. This will not occur, however, until the broach handling chucks have moved downwardly to substantially their lowermost position as will be described later in detail.

In operation, when the broach handling chucks 43 are in the uppermost position, as illustrated in Fig. 1, with the broach handling fixture 39 connected to the bracket 19 by means of jaw elements 31, the workpieces to be broached are positioned on the worktable 7. When the mechanism is in this position, the slidable guide plate 49 will be supported in a raised position by the broach handling chuck fixture 39 and the rods 57, so as to be away from the worktable 7 and permit the placing of the workpieces thereon. The machine is then started and the bracket 19 moves downwardly carrying with it the fixture 39 and the broaches 67. The slidable guide plate 49 will likewise be carried downwardly until the under side of the bosses 52 abut the feet 11 mounted on the worktable. At this time the downward movement of the guide plate 49 will be stopped, while the downward movement of the broach fixture 39 will continue until the levers 33 abut the stationary rods 124 and are forced upwardly to cause the jaw elements 31 to release the broach handling chuck fixture 39. The lower ends of the broaches 67 will have been received within the broach pulling chucks 101 prior to this release and the upper end of the rod 115, which is fixedly connected to the broach pulling chuck bracket 113, will engage the under side of the fixture 39 and support it. The hydraulic circuit within the broaching machine will then cause the broach pulling chucks to move downwardly, at which time they will pull the broaches through the workpieces. The broach handling chuck fixture 39 likewise will slide downwardly along the guide bars 13 in spaced relation to the chucks 101 due to the rod 115, and will thus guide the trailing ends of the broaches throughout the broaching stroke.

The broach handling chucks 43 and the fixture 39 will continue to move downwardly until the abutment rods 100, mounted on the guide plate 49, abut the latch 87 in each of the broach handling chucks 43 to release the broaches 67 from the broach handling chucks. As the guide plate is now positioned just above the worktable 7, the trailing ends of the broaches will be guided until they are just above the workpieces. The broach pulling chucks 101 will then completely pull the broaches through the workpieces.

After the workpieces have been broached, they are removed from the worktable 7 and the broach pulling chucks 101 are moved upwardly. The upper ends of the broaches 67 will then move through the openings in the worktable 7 and will be guided through the apertures 65 in the guide plate 49, due to the bellmouthed lower end of the apertures 65. After passing through the guide plate 49, the upper ends of the broaches will move into the bore 79 in each of the broach handling chuck bodies 69. The broach handling chucks 43 and the fixture 39 will then be moved upwardly by the rod 115 which is connected to the pull chuck frame 113. As the broach handling chucks 43 move upwardly, the latches 87 will be disengaged from the pins 100 and the dog 91 on the inner face of each latch will move into engagement with the groove 93 on the upper end of each broach due to the spring 95, so as to secure the broaches 67 within the broach handling chucks 43.

The upward movement of the broach handling chucks will continue and thus pull the broaches 67 upwardly therewith. When the fixture 39 reaches the position shown in Fig. 2, the truncated triangular bar 47 will be received between the jaw elements 31 connected to the bracket 19. The bracket 19 will then start its upward movement and the levers 33 will become disengaged from the abutment rods 124. The spring 35 will then cause the jaw elements 31 to close around the bar 47 and reconnect the broach handling chuck fixture 39 to the bracket 19. The bracket 19 will then move to its uppermost position, as shown in Fig. 1, thus completing the cycle.

From the foregoing description it can be seen that the long relatively small diameter broaches are guided throughout substantially their entire movement, first by the guide plate 49, which will properly guide them into the workpiece apertures and into the broach pulling chucks 101. The upper or trailing ends of the broaches 67 are guided by the broach handling chucks 43 until they reach their lowermost position where the fixture 39 abuts against the guide plate 49 which is just above the worktable 7 so that any whipping or swaying of the upper end of the broaches 67 is eliminated. Likewise, the broaches 67 will be guided in their return movement so that the danger of breaking the broaches will be completely eliminated. By provision of a separate handling chuck slide whose movements are controlled in part by the pull cylinder and in part by the handling slide, the trailing ends of the broaches are guided for the pull broaching stroke without requiring a long handling slide movement. No attempt is made to illustrate or describe the automatic means for effecting the sequential movements of the handling slide and pull bracket since any conventional means for that purpose may be employed.

Even when long, relatively large diameter broaches are used, instead of the aforementioned relatively small diameter broaches, vibration of the trailing end of these broaches occurs which may result in breakage of the broaches, if the trailing end is not guided. Therefore, even for the larger broaches, the embodiment described above is preferable, but the guide plate 49, which guides the advancing end of the broach, may be eliminated without affecting the remaining structure, or affecting the purview of this invention.

While the machine illustrated and described is a pull down type broaching machine, it is to be understood that the features of this invention may be used on any suitable shuttle type broaching machine without departing from the spirit and scope of the invention as defined in the appended claims.

What is claimed is:

1. In a machine for broaching an opening in a workpiece, a work support adapted to sustain the work against the force exerted by the broaching operation and having an opening to permit the passage of the broach, a reciprocating broach handling chuck located on one side of the work support, a broach pulling chuck located on the opposite side of the support for receiving the broach from the broach handling chuck and pulling it through the work to effect the broaching stroke, a reciprocating slide, a releasable connection between the slide and the broach handling chuck, adapted to permit the broach handling chuck to advance with the broach during the broaching stroke independently of the slide, and means independent of the broach for guiding the handling chuck throughout its reciprocating movement to maintain the same in alignment with the opening in the work support.

2. In a machine for broaching an opening in a workpiece, a work support adapted to sustain the work against the force exerted by a broaching operation and having an opening to permit the passage of the broach, a reciprocating broach handling chuck located on one side of the work support, a broach pulling chuck located on the opposite side of the support for receiving the broach from the broach handling chuck and pulling it through the work to effect the broaching stroke, a reciprocating slide, a releasable connection between the slide and the broach handling chuck, adapted to permit the broach handling chuck to advance with the broach during the broaching stroke independently of the slide, means independent of the broach for guiding the handling chuck throughout its reciprocating movement to maintain the same in alignment with the opening in the work support, and release means in said broach handling chuck adapted to release said broach therefrom when the broach handling chuck approaches the work support and is in close proximity thereto.

3. In a machine for broaching an opening in a workpiece, a work support adapted to sustain the work against the force exerted by the broaching operation and having an opening to permit the passage of a broach, a reciprocating broach handling chuck located on one side of the work support, means for guiding said handling chuck for reciprocation toward and from the support in alignment with said opening, a broach pulling chuck located on the opposite side of the support for receiving the broach from the broach handling chuck and pulling it through the work to effect the broaching stroke, movable guide means disposed between said handling chuck and said work support for guiding the forward end of said broach into said workpiece opening and movable with said handling chuck away from said work support to permit loading of a workpiece when the broaching operation is completed, a movable connection between said guide means and said broach handling chuck to permit said guide means to move toward said work support even though movement of said broach handling chuck toward said work support stops.

4. In a machine for broaching an opening in a workpiece, a work support adapted to sustain the work against the force exerted by a broaching operation and having an opening to permit the passage of the broach, a reciprocating broach handling chuck located on one side of the work support, a broach pulling chuck located on the opposite side of the support for receiving the broach from the broach handling chuck and pulling it through the work to effect the broaching stroke, a reciprocating slide, a releasable connection between the slide and the broach handling chuck, adapted to permit the broach handling chuck to advance with the broach during the broaching stroke independently of the slide, means independent of the broach for guiding the handling chuck throughout its reciprocating movement to maintain the same in alignment with the opening in the work support, and guide means disposed between said broach handling chuck and said work support for guiding the forward end of said broach into said workpiece opening and movable with said broach handling chuck away from said work support to permit loading of a workpiece on said work support when the broaching operation is completed.

5. In a machine for broaching an opening in a workpiece, a work support adapted to sustain the work against the force exerted by a broaching operation and having an opening to permit the passage of the broach, a reciprocating broach handling chuck located on one side of the work support, a broach pulling chuck located on the opposite side of the support for receiving the broach from the broach handling chuck and pulling it through the work to effect the broaching stroke, a reciprocating slide, a releasable connection between the slide and the broach handling chuck, adapted to permit the broach handling chuck to advance with the broach during the broaching stroke independently of the slide, means independent of the broach for guiding the handling chuck throughout its reciprocating movement to maintain the same in alignment with the opening in the work support, guide means disposed between said broach handling chuck and said work support for guiding the forward end of said broach into said workpiece opening and movable with said broach handling chuck away from said work support to permit loading of a workpiece when the broaching operation is completed, and release means in said broach handling chuck adapted to release the broach therefrom when the handling chuck approaches the work support and is in close proximity thereto.

6. In a machine for broaching an opening in a workpiece, a work support adapted to sustain the work against the force exerted by the broaching operation and having an opening to permit the passage of the broach, a reciprocating broach handling chuck located on one side of the work support, means for guiding said handling chuck throughout its reciprocating movement toward and from the support in alignment with said opening, a broach pulling chuck located on the opposite side of the support for receiving the broach from the broach handling chuck and pulling it through the work to effect the broaching stroke, a reciprocating slide, a latch mechanism on said slide adapted to connect the same to the broach handling chuck, and release means adapted to release said latch after the broach handling chuck has advanced the forward end of the broach into the pulling chuck in order to permit said handling chuck to advance with the broach and guide the trailing end thereof during the broaching stroke independently of the slide, and means for limiting the advance of said handling chuck to permit removal of said work from said work support.

7. In a machine for broaching an opening in a workpiece, a work support adapted to sustain the work against the force exerted by a broaching operation and having an opening to permit the passage of the broach, a reciprocating broach handling chuck located on one side of the work support, means for guiding said handling chuck throughout its reciprocating movement toward and from the support in alignment with said opening, a broach pulling chuck located on the opposite side of the support for receiving the broach from the broach handling chuck and pulling it through the work to effect a broaching stroke, a reciprocating slide, a latch mechanism on said slide adapted to connect the same to the broach handling chuck, release means adapted to release said latch after the handling chuck has advanced the forward end of the broach into the pulling chuck in order to permit said handling chuck to advance with the broach and guide the trailing end thereof during the broaching stroke independently of the slide, and means fixedly connected to said broach pulling chuck and adapted to engage said broach handling chuck after the same has been released from said latch to movably support said handling chuck in a fixed relation to said pulling chuck to thereby guide the trailing end of said broach.

8. In a machine for broaching an opening in a workpiece, a work support adapted to sustain the work against the force exerted by a broaching operation and having an opening to permit the passage of the broach, a reciprocating broach handling chuck located on one side of the work support, means for guiding said handling chuck throughout its reciprocating movement toward and from the support in alignment with said opening, a broach pulling chuck located on the opposite side of the support for receiving the broach from the broach handling chuck and pulling it through the work to effect the broaching stroke, a reciprocating slide, a latch mechanism on said slide adapted to connect the same to the broach handling chuck, release means adapted to release said latch after the handling chuck has advanced the forward end of the broach into the pulling chuck in order to permit said handling chuck to advance with the broach and guide the trailing end thereof during the broaching stroke independently of the slide, means fixedly connected to said broach pulling chuck and adapted to engage said broach handling chuck after the same has been released from said slide to movably support said handling chuck in a fixed relation to said pulling chuck to thereby guide the trailing end of said broach toward said work support, and release means in said broach handling chuck adapted to release said broach therefrom when the handling chuck approaches the work support and is in close proximity thereto.

9. In a vertical pull down machine for broaching an opening in a workpiece, a work support adapted to sustain the work against the force exerted by a broaching operation and having an opening to permit the passage of the broach, a reciprocating broach handling chuck located on one side of the work support, means for guiding said handling chuck throughout its reciprocating movement toward and from the support in alignment with said opening, a broach pulling chuck located on the opposite side of the support for receiving the broach from the broach handling chuck and pulling it through the work to effect the broaching stroke, a reciprocating slide, a latch mechanism on said slide adapted to connect the same to the broach handling chuck, release means adapted to release said latch after the handling chuck has advanced the forward end of the broach into the pulling chuck in order to permit said handling chuck to advance with the broach and guide the trailing end thereof during the broaching stroke independently of the slide, means fixedly connected to said pulling chuck and adapted to engage said handling chuck after the same has been released from said slide to movably support the latter in a fixed relation to said pulling chuck, guide means disposed between said broach handling chuck and said work support for guiding the forward end of the broach into the workpiece opening and movable with said handling chuck away from said work support to permit loading of a workpiece when the broaching operation is completed, and release means in said handling chuck adapted to release said broach therefrom when the handling chuck approaches the work support and is in close proximity thereto.

10. In a vertical pull down machine for broaching an opening in a workpiece, a work support adapted to sustain the work against the force exerted by the broaching operation and having an opening to permit passage of the broach, stationary guide bars supported on said work support and extending parallel to the direction of movement of the broach, a reciprocating broach handling chuck slidably mounted on said guide bars and located on one side of the work support so as to be movable toward and from the support in alignment with said opening, a broach pulling chuck located on the opposite side of the support for receiving the broach from the broach handling chuck and pulling it through the work to effect the broaching stroke, movable guide means slidably mounted on said stationary guide bars and disposed between said broach handling chuck and said work support to guide the leading end of the broach into said workpiece opening, means fixedly connected to said guide means and operatively connected to said broach handling chuck to cause said guide means to move with said chuck into close proximity with said work support and so as to cause said guide means to move away from said work support with said handling chuck to permit loading of a workpiece on said work support when the broaching operation is completed.

11. In a vertical pull down machine for broaching an opening in a workpiece, a work support adapted to sustain the work against the force exerted by the broaching operation and having an opening to permit passage of the broach, stationary guide bars supported on said work support and extending parallel to the direction of movement of the broach, a broach handling chuck slidably mounted on said guide bars and located on one side of the work support so as to be movable toward and from the support in alignment with said opening, a broach pulling chuck located on the opposite side of the support for receiving the broach from the broach handling chuck and pulling it through the work to effect the broaching stroke, a reciprocating slide, a latch mechanism on said slide adapted to connect the same to the broach handling chuck, release means for releasing said chuck from said latch after the handling chuck has advanced the forward end of the broach into the pulling chuck in order to permit said handling chuck to advance with the broach and guide the trailing end thereof during the broaching stroke independently of the slide, guide means slidably mounted on said stationary guide bars and disposed between said broach handling chuck and said work support for guiding the forward end of the broach into said workpiece opening, rod means rigidly connected to said guide means and extending parallel to said stationary guide bars to slidably receive said broach handling chuck so as to cause said guide means to move with said chuck into close proximity with said work support and so as to cause said guide means to move away from said work support with said handling chuck to permit loading of a workpiece on said work support when the broaching operation is completed, and release means in said handling chuck adapted to release said broach therefrom when the handling chuck approaches the work support and is in close proximity thereto.

DENES PATAKI.
BENEDICT WELTE.

REFERENCES CITED

The following references are of record in the file of this patent:

UNITED STATES PATENTS

| Number | Name | Date |
|---|---|---|
| 1,937,121 | La Pointe | Nov. 28, 1933 |
| 2,135,157 | West | Nov. 1, 1938 |
| 2,292,440 | Gotberg | Aug. 11, 1942 |
| 2,372,823 | Gotberg | Apr. 3, 1945 |

FOREIGN PATENTS

| Number | Country | Date |
|---|---|---|
| 440,852 | Great Britain | Jan. 7, 1936 |
| 541,158 | Great Britain | Nov. 14, 1941 |